(12) United States Patent
Li (10) Patent No.: US 11,640,511 B1
(45) Date of Patent: May 2, 2023

(54) ELECTRONIC TAG DEVICE (71) Applicant: Bing Xuan Li, Hsinchu (TW)

(72) Inventor: Bing Xuan Li, Hsinchu (TW)

( * ) Notice: Subject to any disclaimer, the term of this patent is extended or adjusted under 35 U.S.C. 154(b) by 0 days.

(21) Appl. No.: 17/955,912

(22) Filed: Sep. 29, 2022

(51) Int. Cl.
*G06K 19/07* (2006.01)

(52) U.S. Cl.
CPC .................. *G06K 19/0724* (2013.01)

(58) Field of Classification Search
CPC ........................ G06K 19/0724; G07B 15/063
USPC ......................................................... 235/492
See application file for complete search history.

(56) References Cited

U.S. PATENT DOCUMENTS

2007/0176750 A1\* 8/2007 Sakai ..................... G06Q 10/08
340/10.51
2020/0082722 A1\* 3/2020 Beiski ................ G06K 7/10366
2022/0351551 A1\* 11/2022 Cavanagh ............ G07B 15/063

\* cited by examiner

*Primary Examiner* — Paultep Savusdiphol
(74) *Attorney, Agent, or Firm* — Zhigang Ma (57) ABSTRACT

A electronic tag device is provided and includes: a processor; a memory connected to the processor and stored with multiple sets of tag data; a wireless data transmission circuit connected to the processor and used to connect an electronic device; a radio frequency identification (RFID) tag chip connected to the processor; a cellular communication circuit connected to the processor and provided with a subscriber identity module (SIM) interface used to connect a SIM card; and a positioning circuit connected to the cellular communication circuit. When a geographical region where the electronic tag device is located changes, the electronic tag device can automatically select a target set of tag data corresponding to a current geographical region from the multiple sets of tag data for data updating, thereby avoiding an additional expense for toll settlement.

20 Claims, 8 Drawing Sheets

ELECTRONIC TAG DEVICE

TECHNICAL FIELD

The disclosure relates to the field of electronic tag communication technologies, in particularly to an electronic tag device.

BACKGROUND

With the rapid development of Internet of Things (IoT) technology, radio frequency identification (RFID) electronic tags with identification, object tracking, information collection and other functions have been widely used in industrial automation, commercial automation and many other fields. The RFID electronic tags belong to a non-contact automatic identification technology. They use radio frequency signals to identify target objects and obtain relevant data. The identification work does not require manual intervention. As a wireless version of barcode, the RFID technology has the advantages of waterproof, antimagnetic, high temperature resistant, long service life, large reading distance, data on the tag can be encrypted, larger storage capacity, free change of storage information, etc.

However, existing RFID electronic tags each only store single tag data, which cannot meet the actual needs of users.

SUMMARY

The disclosure provides an electronic tag device, the electronic tag device can store multiple set of tag data, and thereby meeting the actual needs of users.

The disclosure provides the electronic tag device, including: a processor; a memory, connected to the processor and configured (i.e., structured and arranged) to store multiple sets of tag data; a wireless data transmission circuit, connected to the processor and configured to wirelessly connect an electronic device; a radio frequency identification (RFID) tag chip, connected to the processor; a cellular communication circuit, connected to the processor; and the cellular communication circuit being provided with a subscriber identity module (SIM) interface configured to connect a SIM card; and a positioning circuit, connected to the cellular communication circuit;

the positioning circuit being configured to obtain current positional data of the electronic tag device and transmit the current positional data to the cellular communication circuit;

the cellular communication circuit being configured to receive the current positional data, wirelessly transmit the current positional data to a server to thereby enable the server to output a tag data updating instruction in response to a current geographical region where the electronic tag device is located determined by the current positional data is different from a previously determined geographical region, wirelessly receive the tag data updating instruction from the server, and transmit the tag data updating instruction to the processor; and the processor being configured to obtain a target set of tag data corresponding to the tag data updating instruction from the multiple sets of tag data stored in the memory and transmit the target set of tag data to the RFID tag chip for tag data updating.

In an embodiment, the cellular communication circuit is specifically configured to receive the current positional data, encrypt the current positional data, and wirelessly transmit the encrypted current positional data to the server.

In an embodiment, the cellular communication circuit is specifically configured to wirelessly receive the tag data updating instruction after being encrypted by the server, decrypt the received tag data updating instruction, and transmit the decrypted tag data updating instruction to the processor.

In an embodiment, each set of the multiple sets of tag data includes: an electronic product code (EPC) and a tag identifier (TID).

In an embodiment, the TIDs of the multiple sets of tag data include multiple account information corresponding to different geographical regions respectively, and the TID of the target set of tag data includes one of the multiple account information corresponding to the current geographical region being one of the different geographical regions.

In an embodiment, the positioning circuit supports at least one selected from the group consisting of a global positioning system (GPS), a BeiDou navigation satellite system (BDS), a Galileo satellite navigation system (GALILEO) and a global navigation satellite system (GLONASS).

In an embodiment, the positioning circuit includes: a global navigation satellite system (GNSS) integrated circuit (IC) connected to the cellular communication circuit, and a GNSS antenna connected to the GNSS IC.

In an embodiment, the cellular communication circuit includes: a baseband processor, provided with the SIM interface; and a radio frequency (RF) transceiver, connected to the baseband processor; the electronic tag device further including: a cellular communication antenna, connected to the RF transceiver; and the positioning circuit being connected to the baseband processor.

In an embodiment, the electronic tag device further includes: a printed circuit board (PCB), provided with a card slot; and the SIM card, disposed in the card slot and connected to the SIM interface; the cellular communication circuit and the positioning circuit being both disposed on the PCB.

In an embodiment, the wireless data transmission circuit includes: a BLUETOOTH communication circuit connected to the processor and configured to wirelessly connect the electronic device.

In an embodiment, the BLUETOOTH communication circuit is configured to receive BLUETOOTH communication data from the electronic device, convert the BLUETOOTH communication data to obtain converted BLUETOOTH communication data, and transmit the converted BLUETOOTH communication data to the processor; and the processor is configured to store the converted BLUETOOTH communication data into the memory.

In an embodiment, the processor is configured to obtain data to be displayed from the memory, and transmit the data to be displayed to the BLUETOOTH communication circuit; the BLUETOOTH communication circuit is configured to receive the data to be displayed, convert the data to be displayed and then output the converted data to be displayed to the electronic device for user viewing.

In an embodiment, the electronic tag device further includes: a power protected circuit, connected to the processor; and a peripheral interface, connected to the power protected circuit and configured to connect an in-vehicle power supply.

In an embodiment, the electronic tag device further includes: a light emitting diode (LED) indicator, connected to the processor, and the LED indicator being configured to emit light of different colors for indicating different working states of the electronic tag device.

In an embodiment, the peripheral interface includes a universal serial bus (USB) type-C interface; the SIM card is a 4th generation communication system (4G) long term evolution (LTE) nano SIM card; and the processor, the memory and the wireless data transmission circuit all are integrated in a single chip.

In addition, the disclosure provides an electronic tag device including:

a system-on-chip (SoC) controller with a processor and a memory, the memory being configured to store multiple sets of tag data corresponding to different geographic regions;

a cellular communication and positioning chip, connected to the SoC controller;

a RFID tag chip, connected to the SoC controller;

the cellular communication and positioning chip being configured to obtain current positional data of the electronic tag device, wirelessly transmit the current positional data to a server to thereby enable the server to output a tag data updating instruction in response to a current geographical region where the electronic tag device is located determined by the current positional data is different from a previously determined geographical region, wirelessly receive the tag data updating instruction from the server, and transmit the tag data updating instruction to the SoC controller; and the SoC controller is configured to obtain a target set of tag data corresponding to the tag data updating instruction from the multiple sets of tag data stored in the memory and transmit the target set of tag data to the RFID tag chip for tag data updating.

In an embodiment, the SoC controller is further provided with a BLUETOOTH transceiver.

In an embodiment, each set of the multiple sets of tag data includes an EPC and a TID, the TIDs of the multiple sets of tag data include multiple account information corresponding to the different geographic regions respectively, and the TID of the target set of tag data includes one of the multiple account information corresponding to the current geographical region being one of the different geographical regions.

In an embodiment, the electronic tag device further includes:

a cellular external antenna connection port and a GPS external antenna connection port, individually connected to the cellular communication and positioning chip;

a SIM slot, connected to the cellular communication and positioning chip and configured to receive a SIM card;

a PCB antenna, connected to the RFID tag chip;

a power protected circuit, connected to the SoC controller; and a USB type-C interface, connected to the power protected circuit and configured to connect an in-vehicle power supply.

In an embodiment, the SoC controller is connected to the cellular communication and positioning chip via a universal asynchronous receiver/transmitter (UART) bus, and the SoC controller is connected to the RFID tag chip via an inter-integrated circuit (I2C) bus.

Beneficial effects of the disclosure are as follows.

The electronic tag device can store the multiple sets of tag data, which can meet the actual need of users. Specifically, the memory of the electronic tag device is stored with the multiple sets of tag data corresponding to different geographic regions respectively, the electronic tag device can acquire the positional data in real time or periodically and transmit the positional data to the server, the server output the tag data updating instruction when it determines that the current geographical region where the electronic tag device is located determined by the positional data is different from a previously determined geographical region, i.e., the geographical region of the electronic tag device has changed, the electronic tag device obtain the target set of tag data corresponding to the tag data updating instruction from the multiple sets of tag data to complete tag data updating. Therefore, when the electronic tag device disclosed by the disclosure is disposed on an object such as a vehicle, which can save an additional expense for toll settlement caused by an existing electronic tag device of the vehicle being bounded with only one account information. It is conducive to the development of the car leasing industry.

BRIEF DESCRIPTION OF DRAWINGS

In order to more clearly explain embodiments of the disclosure or the technical schemes in the prior art, the following will briefly introduce the drawings that need to be used in the description of the embodiments or the prior art. It is obvious that the drawings in the following description are only some of the embodiments of the disclosure. For those skilled in the art, other drawings can be obtained according to the structure shown in these drawings without paying creative work.

A realization of purposes, functional characteristics and advantages of the disclosure will be further described with reference to the attached drawings in combination with some embodiments.

DETAILED DESCRIPTION OF EMBODIMENTS

The technical schemes in the embodiments of the disclosure will be clearly and completely described below in combination with the drawings in the embodiments of the disclosure. Apparently, the described embodiments are only some of the embodiments of the disclosure, not all of them. Based on the embodiments in the disclosure, all other embodiments obtained by those skilled in the art without creative work should be within the scope of the disclosure.

In the disclosure, unless specific provisions and limitations, the terms "connect", "dispose" and etc., should be understood in a broad sense. For example, the term "connect" can be directly connected, indirectly connected through an intermediate medium, fixedly connected, a detachably connected, integrated into one, or electrically connected. It can be a connection within two elements or an interactive relationship between the two elements, unless the specific provisions and limitations, for those skilled in the art, the specific meaning of the above terms in the disclosure can be understood according to the specific situation.

In addition, the technical schemes among various embodiments can be combined with one another, but it must be based on the realization of those skilled in the art. When the combination of technical schemes is contradictory or impossible, it should be considered that the combination of technical schemes does not exist and is not within the protection scope of the disclosure.

Figure 1:
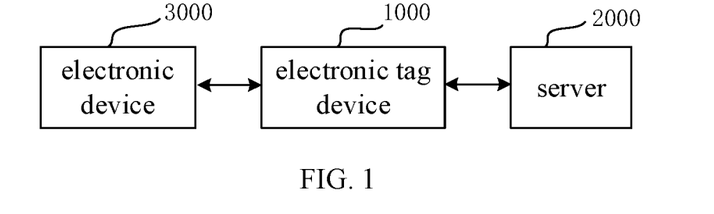
FIG. 1 is a schematic diagram of an application scenario of an electronic tag device according to an embodiment of the disclosure.

An embodiment of the disclosure provide an electronic tag device 1000. Referring to FIG. 1, the electronic tag device 1000 is individually connected with a server 2000 and an electronic device 3000, and thus the electronic tag device 1000 can communicate with the server 2000 and the electronic device 3000.

Specifically, the server 2000 can be an independent physical server, or a server cluster or distributed system composed of multiple physical servers, or cloud servers or server clusters that provide cloud services, cloud databases, cloud computing, cloud functions, cloud storage, network services, cloud communications, middleware services, domain name services, security services, content delivery network (CDN), big data, artificial intelligence platforms and other basic cloud computing services. The server 2000 can be a personal server, enterprise server or government server. It should be noted that the disclosure does not limit the type and source of the server 2000.

Specifically, the electronic device 3000 can be smart phones (such as phones with android operation systems, phones with iPhone operation systems (IOS), etc.), tablet computers, laptops, mobile internet devices (MIDs), desktop computers, smart appliances, vehicle terminals (such as vehicle navigation terminals, vehicle computers, etc.), smart watches, etc. It should be noted that the disclosure does not limit the specific type of the electronic device 3000. For example, the electronic device 3000 may be the smart phone of a user.

Figure 2:
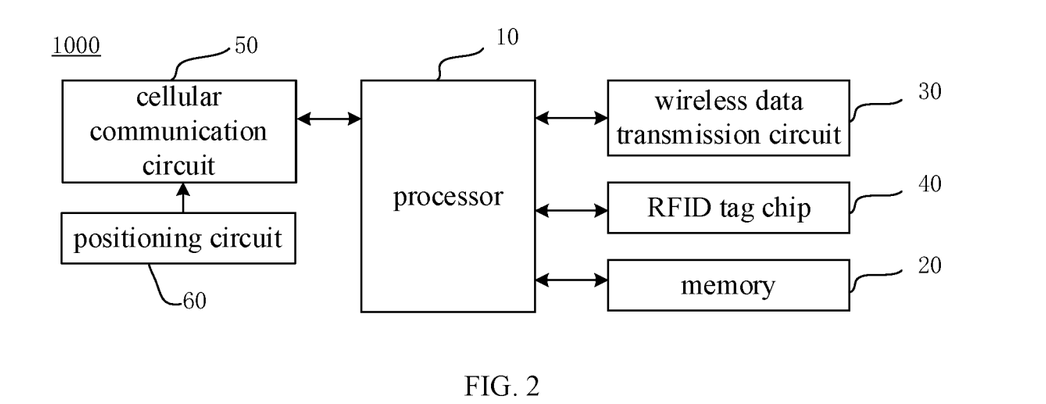
FIG. 2 is a schematic structural diagram of an electronic tag device according to an embodiment of the disclosure.

As illustrated in FIG. 2, the electronic tag device 1000 may include a processor 10, a memory 20, a wireless data transmission circuit 30, a RFID tag chip 40, a cellular communication circuit 50 and a positioning circuit 60.

The processor 10 is electrically connected with the memory 20, the wireless data transmission circuit 30, the RFID tag chip 40 and the cellular communication circuit 50. The positioning circuit 60 is electrically connected with the cellular communication circuit 50.

The positioning circuit 60 is configured to obtain current positional data of the electronic tag device 1000 and transmit the current positional data to the cellular communication circuit 50.

The cellular communication circuit 50 is configured to receive the current positional data, wirelessly transmit the current positional data to the server 2000 to thereby enable the server 2000 to output a tag data updating instruction in response to a current geographical region where the electronic tag device 1000 is located determined by the current positional data is different from a previously determined geographical region, wirelessly receive the tag data updating instruction from the server 2000, and transmit the tag data updating instruction to the processor 10.

The processor 10 is configured to obtain a target set of tag data corresponding to the tag data updating instruction from multiple sets of tag data stored in the memory 20 and transmit the target set of tag data to the RFID tag chip 40 for tag data updating.

At present, a non-stop electronic toll collection system is an advanced road toll collection system. By installing an electronic tag device on a vehicle, when the vehicle is approaching a toll station, the electronic tag device and the toll station wirelessly communicate with each other, and then the vehicle can be recorded for subsequent toll settlement. However, in the USA, the vehicle traveling across different geographical regions, such as the vehicle traveling across different states in the USA, will encounter an additional expense for toll settlement in case of the electronic tag device of the vehicle bounded with only one account information, which has a great impact on some industries, such as the car leasing industry. Generally, the car leasing is carried out at a fixed fee. When a leaseholder drives the vehicle across the different states, the vehicle will encounter the additional expense, which need to be borne by the car leasing company itself. In this way, the revenue and development of the car leasing company will be greatly affected. For example, a car leasing company registers an account for an electronic tag device in New Mexico, the electronic tag device stores account information corresponding to New Mexico, the car installed with the electronic tag device will not encounter the additional expense when being driven in New Mexico, however, when a leaseholder drives the car from New Mexico to Texas, in addition to a road toll, the car will encounter an additional expense when the car enters Texas caused by the electronic tag device of the car being bounded with only the account information corresponding to the New Mexico, the additional expense can be understood as a handling fee incurred due to crossing different states, which greatly limits the development of the car leasing industry.

The electronic tag device 1000 can be installed on a vehicle, which can avoid the above additional expense. Specifically, the memory 20 stores the multiple sets of tag data corresponding to different geographical regions respectively, the positioning circuit 60 obtains the current positional data of the electronic tag device 1000 in real time or periodically, i.e., the positioning circuit 60 obtains the current positional data of the vehicle and transmits the current positional data to the cellular communication circuit 50, the cellular communication circuit 50 outputs the current positional data to the server 2000 to enable the server 2000 to output the tag data updating instruction when the geographical region, where the electronic tag device 1000 is located, changes, i.e., when the vehicle travels cross the different geographical regions, the cellular communication circuit 50 receives the tag data updating instruction from the server 2000 and transmits the tag data updating instruction to the processor 10, the processor 10 obtains the target set of tag data corresponding to the tag data updating instruction from the multiple sets of tag data and transmits the target set of tag data to the RFID tag chip 40, the RFID tag chip 40 updates a previous set of tag data to the target set of tag data to complete tag data updating. Therefore, when the vehicle is driven across the different geographical regions, no additional expense is incurred because non-local tag data (i.e., the previous set of tag data) has been replaced by local tag data (i.e., the target set of tag data). The electronic tag device 1000 provided by the embodiment can be installed on the vehicle to save the additional expense for toll settlement caused by the existing electronic tag device of the vehicle being bounded with only one account information, and it is conducive to the development of the car leasing industry.

In an illustrated embodiment, the previously determined geographical region may refer to a geographical region determined by immediately previous positional data, i.e., the previously determined geographical region may be an immediately previous determined geographical region. The current geographical region where the electronic tag device 1000 is located determined by the current positional data is different from the previously determined geographical region, which can be understood that the geographical region, where the electronic tag device 1000 is located, changes, i.e., the current positional data is not within a data range of the previously determined geographical region and is within a data range of the current geographical region.

In an illustrated embodiment, each set of the multiple sets of tag data may include: an electronic product code (EPC) and a tag identifier (TID).

In an illustrated embodiment, the TIDs of the multiple sets of tag data may include multiple account information corresponding to different geographical regions respectively. The different geographical regions may be different administrative regions, such as different states in the United States of America (USA). The TID of the target set of tag data may include one of the multiple account information corresponding to the current geographical region being one of the different geographical regions.

Specifically, the multiple account information corresponding to different geographical regions can be understood that the user registers accounts in the different geographical regions respectively to store the multiple account information of the geographical regions in the memory 20.

For example, when the RFID tag chip 40 of the electronic tag device 1000 stores the account information of the geographical region A, when a vehicle installed with the electronic tag device 1000 is driven in the geographical region A, as the RFID tag chip 40 stores local tag data of the geographical region A, no additional cost is incurred. When the vehicle is driven from the geographical regions A to B, the RFID tag chip 40 of the electronic tag device 1000 can update the account information of the geographical region A to the account information of the geographical region B, at this time, as the RFID tag chip 40 stores local tag data of the geographical region B, and there is no the additional expense.

In an illustrated embodiment, the cellular communication circuit 50 is specifically configured to receive the current positional data, encrypt the current positional data, and wirelessly transmit the encrypted current positional data to the server 2000. In addition to the communication function, the cellular communication circuit 50 further has the data encryption function, which ensures the security of data transmission.

In an illustrated embodiment, the cellular communication circuit 50 is specifically configured to wirelessly receive the tag data updating instruction after being encrypted by the server 2000, decrypt the received tag data updating instruction, and transmit the decrypted tag data updating instruction to the processor 10. In addition to the communication function, the cellular communication circuit 50 further has the data decryption function, which ensures the security of data transmission.

In an illustrated embodiment, the processor 10 may be a microprocessor, the memory 20 may include a static random-access memory (SRAM), and a read-only memory (ROM). The RFID tag chip 40 may be a Monza© X-8K tag chip. The disclosure does not limit specific compositions of the processor 10, memory 20 and RFID tag chip 40, the foregoing is only for easy understanding, other compositions that can realize the functions related to the disclosure are applicable to the disclosure.

Figure 4:
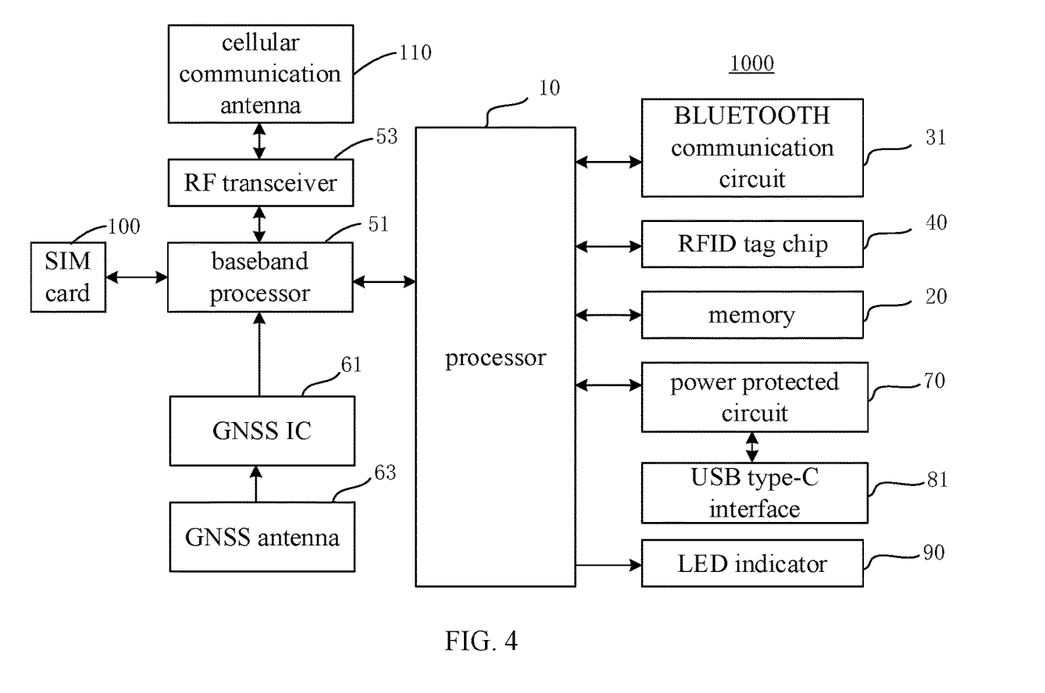
FIG. 4 is a schematic structural diagram of an electronic tag device according to an embodiment of the disclosure.

As illustrated in FIG. 4, in an illustrated embodiment, the wireless data transmission circuit 30 may include a BLUETOOTH communication circuit 31 connected to the processor 10. The BLUETOOTH communication circuit 31 is configured to wirelessly connect the electronic device 3000.

The electronic tag device 1000 communicates with the electronic device 3000 through the BLUETOOTH communication circuit 31. Specifically, in an embodiment, the BLUETOOTH communication circuit 31 can receive BLUETOOTH data from the electronic device 3000, convert the BLUETOOTH data to obtain converted BLUETOOTH data, and transmit the converted BLUETOOTH data to the processor 10. The processor 10 can store the converted BLUETOOTH data into the memory 20. In another embodiment, the processor 10 can obtain data to be displayed from the memory 20, and transmit the data to be displayed to the BLUETOOTH communication circuit 31. The BLUETOOTH communication circuit 31 can receive the data to be displayed, convert the data to be displayed and then output the converted data to be displayed to the electronic device 3000 for user viewing.

The electronic tag device 1000 communicates with the electronic device 3000 through the BLUETOOTH communication circuit 31, which can transmit the data that the user needs to view to the electronic device 3000 through the BLUETOOTH communication circuit 31 and store new data into the electronic tag device 1000 through the BLUETOOTH communication circuit 31, it is convenient for the user to understand relevant information of the electronic tag device 1000 and to operate the electronic tag device 1000.

Figure 5:
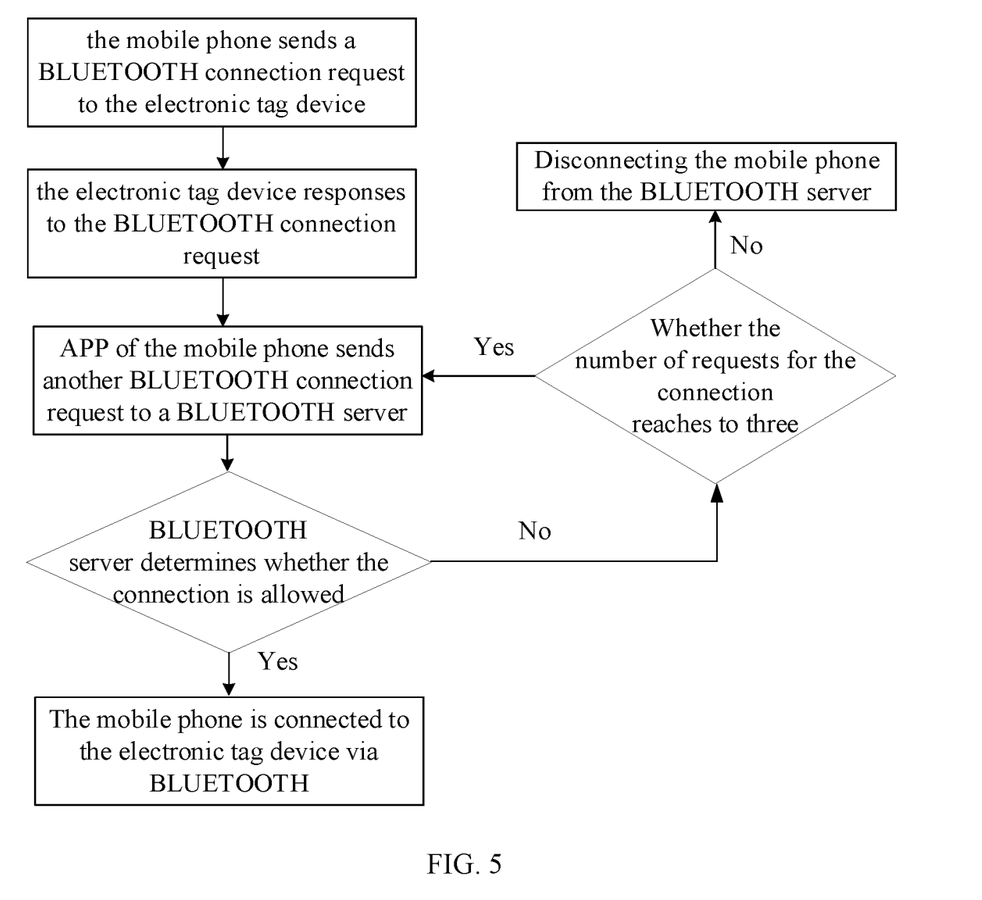
FIG. 5 is a flowchart of a BLUETOOTH connection progress between an electronic tag device and an electronic device according to an embodiment of the disclosure.

In an exemplary embodiment, FIG. 5 illustrates a flowchart of a BLUETOOTH connection progress between the electronic tag device 1000 and the electronic device 3000. Specifically, the electronic device 3000, such as the mobile phone of the user, sends a BLUETOOTH connection request to the electronic tag device 1000, at this time, the BLUETOOTH communication circuit 31 of the electronic tag device 1000 is in a request detection state, when the BLUETOOTH connection request is detected by the BLUETOOTH communication circuit 31 of the electronic tag device 1000, the BLUETOOTH communication circuit 31 determines whether to response to this request, after the BLUETOOTH communication circuit 31 responses to this request, an application (APP) of the mobile phone sends another BLUETOOTH connection request to a BLUETOOTH server, which can be different from the server 2000 or same as the server 2000; the BLUETOOTH server receives the another BLUETOOTH connection request and determines whether to allow the connection between the mobile phone and the electronic tag device 1000, when the BLUETOOTH server allows the connection, the mobile phone can be connected to the electronic tag device 1000 through the BLUETOOTH communication circuit 31 for bi-directional data transmission. When the BLUETOOTH server does not allow the connection, the mobile phone determines whether the requests reach to three times, if the requests do not reach to three times, the mobile phone is disconnected with the BLUETOOTH server, if the requests reach to the three times, the APP sends the BLUETOOTH connection request to the BLUETOOTH server again. The aforementioned BLUETOOTH connection process can be understood as the process of establishing the BLUETOOTH connection between the electronic tag device 1000 and the electronic device 3000 for the first time, after the BLUETOOTH connection may be without the aforementioned process.

Figure 6:
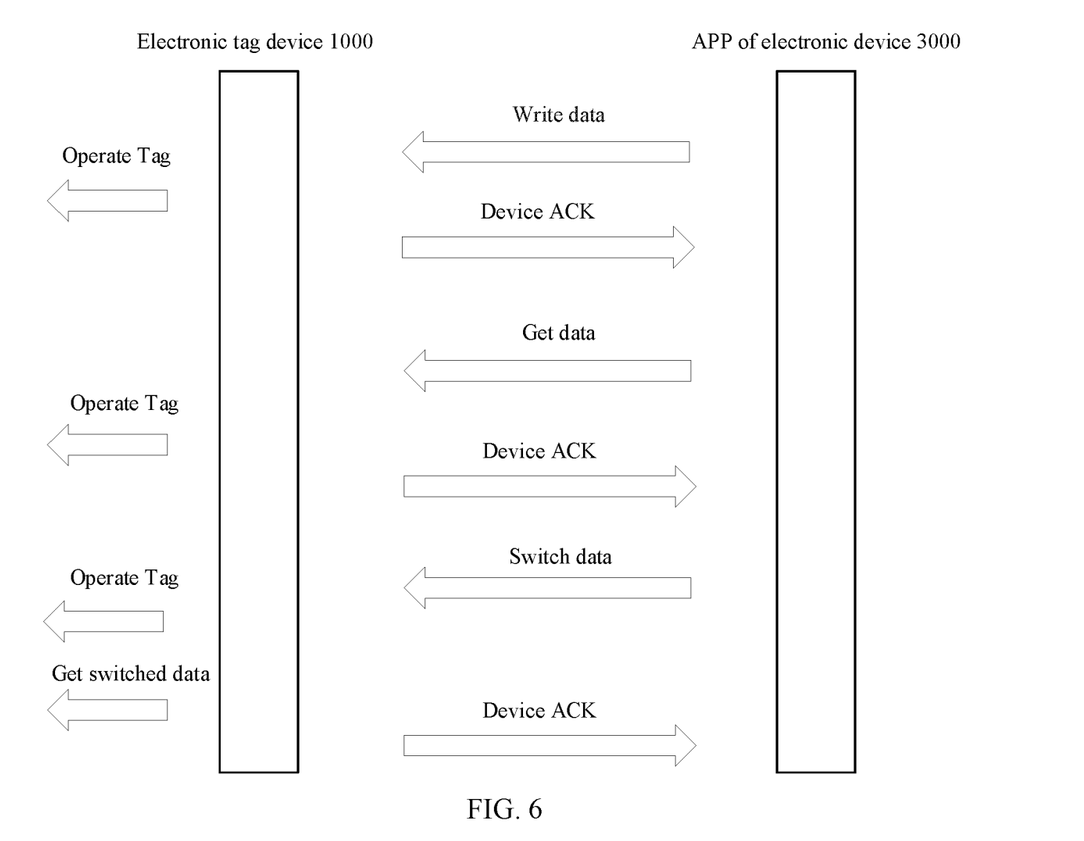
FIG. 6 is a flowchart of a BLUETOOTH communication progress between the electronic tag device and the electronic device according to an embodiment of the disclosure.

In an exemplary embodiment, after the electronic device 3000 is connected to the BLUETOOTH communication circuit 31 of the electronic tag device 1000 successfully, the electronic device 3000 can communicate with the electronic tag device 1000, FIG. 6 illustrates a BLUETOOTH communication progress between the electronic tag device 1000 and the electronic device 3000, the APP of the electronic device 3000 can write data into the electronic tag device 1000, get data from the electronic tag device 1000, and control the electronic tag device 1000 to switch data and obtain the switched data.

In an illustrated embodiment, the BLUETOOTH communication circuit 31 may include: a BLUETOOTH antenna and a BLUETOOTH transceiver connected to the BLUETOOTH antenna. The BLUETOOTH transceiver may be connected with the processor 10. For example, the BLUETOOTH transceiver may be a BLUETOOTH transceiver 311 shown in FIG. 7.

In an illustrated embodiment, the BLUETOOTH communication circuit 31, the processor 10 and the memory 20 can be integrated in a single chip, for example, a system-on-chip (SoC) controller, the SoC controller may be a chip with a model of ESP32-C3. The SoC controller may be a SoC controller 1100 shown in FIG. 9.

The cellular communication circuit 50 can communicate with the server 2000. As illustrated in FIG. 4, in an illustrated embodiment, the cellular communication circuit 50 may include a baseband processor 51 connected to the processor 10 and a RF transceiver 53 connected to the baseband processor 51.

Figure 9:
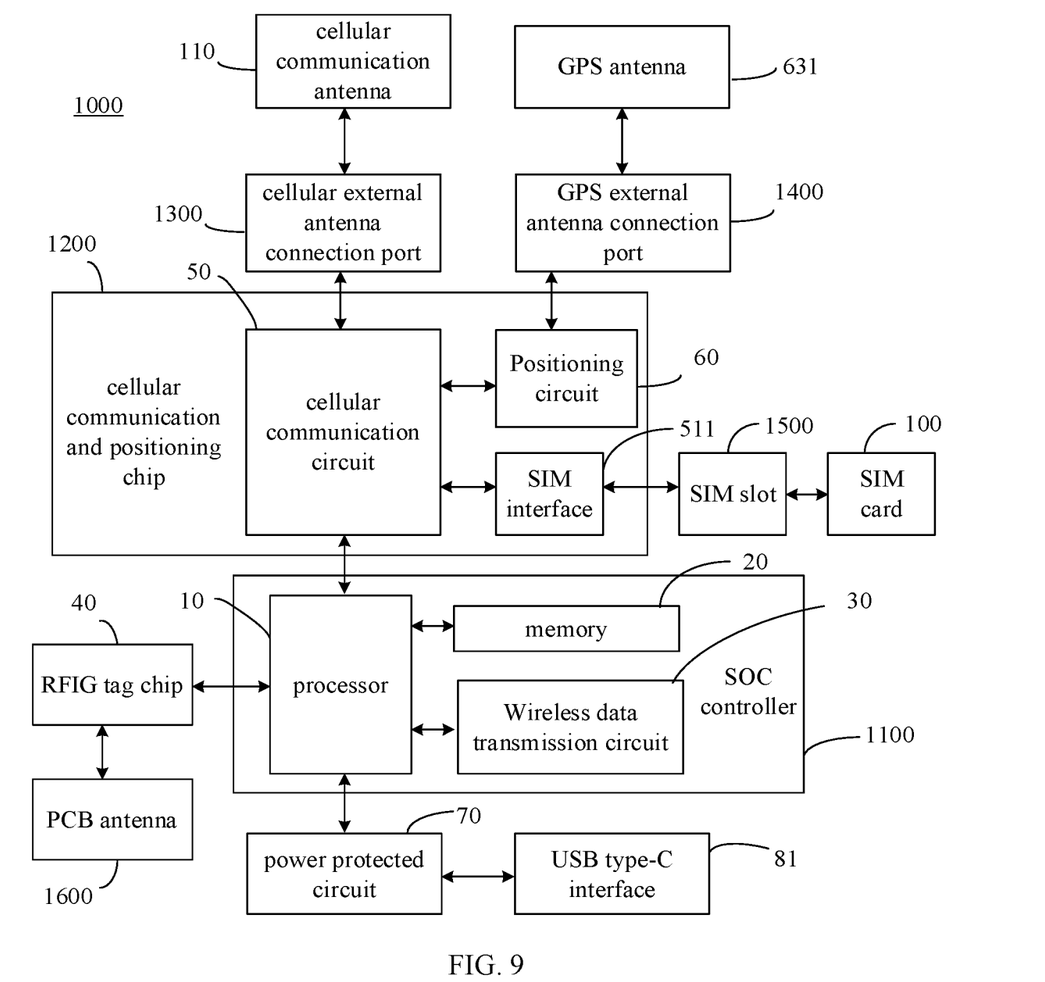
FIG. 9 is a schematic structural diagram of an electronic tag device according to an embodiment of the disclosure.

The baseband processor 51 is provided with a SIM interface, for example, the SIM interface may be a SIM interface 511 shown in FIG. 9. The electronic tag device 1000 further includes: a SIM card 100 connected to the SIM interface, and a cellular communication antenna 110 connected to the RF transceiver 53. The positioning circuit 60 may be connected to the baseband processor 51.

The electronic tag device 1000 may further include: a printed circuit board (PCB) provided with a card slot. The SIM card 100 is disposed in the card slot. The card slot may be a card slot 1500 shown in FIG. 9.

In an illustrated embodiment, the cellular communication circuit 50 and the positioning circuit 60 may both be disposed on the PCB, i.e., the cellular communication circuit 50 and the positioning circuit 60 may be integrated in a single chip, for example, a cellular communication and positioning chip, the cellular communication and positioning chip may be a chip with a model of SARA-R510M8S. In addition, the cellular communication antenna 110 may be integrated in the cellular communication and positioning chip or independent from the cellular communication and positioning chip. The cellular communication and positioning chip may be a cellular communication and positioning chip 1200 shown in FIG. 9.

The SIM card 100 may be a 4th generation communication system (4G) long term evolution (LTE) nano SIM card or other type cards such as 3G SIM card.

The baseband processor 51 may have the above communication function of the cellular communication circuit 50, and further have the above data encryption function and data decryption function of the cellular communication circuit 50.

In an illustrated embodiment, the positioning circuit 60 supports at least one selected from the group consisting of a global positioning system (GPS), a BeiDou navigation satellite system (BDS), a Galileo satellite navigation system (GALILEO) and a global navigation satellite system (GLONASS).

In an illustrated embodiment, as illustrated in FIG. 4, the positioning circuit 60 may include: a GNSS IC 61 connected to the cellular communication circuit 50 and a GNSS antenna 63 connected to the GNSS IC 61. Specifically, the GNSS IC 61 is connected to the baseband processor 51 of the cellular communication circuit 50. The GNSS IC 61 may be a chip with a model of UBX-M8.

For example, the GNSS IC 61 may be a GPS IC, the GNSS antenna 63 may be a GPS antenna. As shown in FIG. 9, there may be another GPS antenna 631 connected to the positioning circuit 60.

It is worth mentioning here that, in another illustrated embodiment, the positioning circuit 60 may include: the GNSS IC 61, and the GNSS IC 61 may be provided with a GNSS antenna therein. In a still another illustrated embodiment, the positioning circuit 60 may include: the GNSS IC 61 and the GNSS antenna 63 connected to the GNSS IC 61, in addition, the GNSS IC 61 may be provided another GNSS antenna therein.

The electronic tag device 1000 having the positioning circuit 60 can obtain better positioning effect in different environments.

Figure 3:
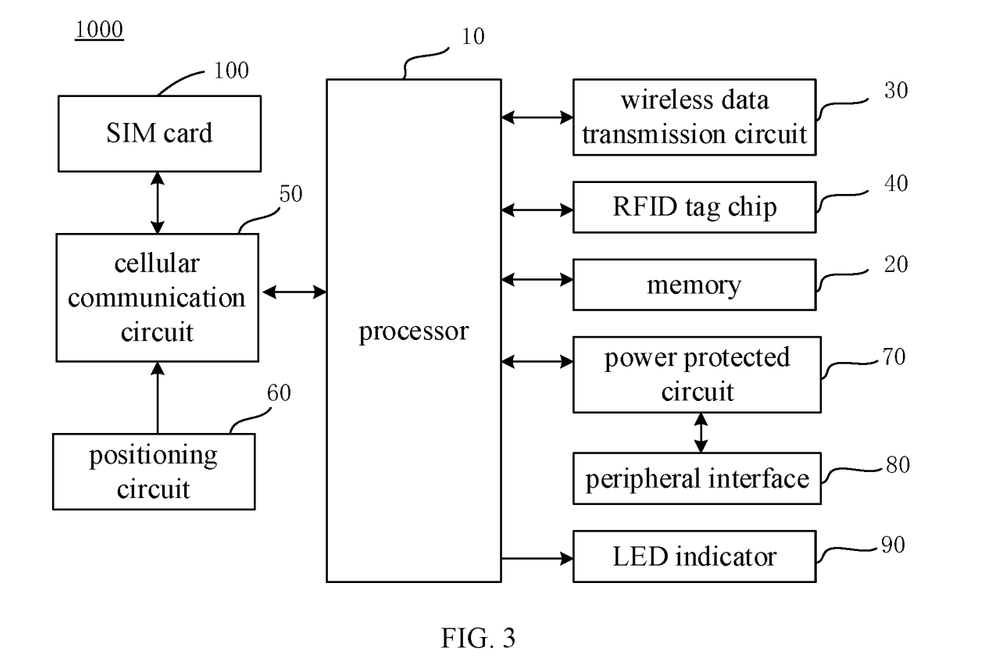
FIG. 3 is a schematic structural diagram of an electronic tag device according to an embodiment of the disclosure.

In an illustrated embodiment, as illustrated in FIG. 3, the electronic tag device 1000 may further include: a power protected circuit 70 connected to the processor 10 and a peripheral interface 80 connected to the power protected circuit 70.

In an illustrated embodiment, the power protected circuit 70 may include a transient voltage suppression (TVS) diode and a Schottky barrier diode, for example, a model of the TVS diode is SD24C and a model of the Schottky barrier diode is 1N5819HW-7-F.

The peripheral interface 80 can connect a power supply such as an in-vehicle power supply to obtain a power, the power may be 12V.

In an illustrated embodiment, as shown in FIG. 4, the peripheral interface 80 may include a universal serial bus (USB) type-C interface 81 configured to connect the in-vehicle power supply. The USB type-C interface 81 can communicate with a personal computer (PC).

Furthermore, the peripheral interface 80 may further include at least one of a general purpose input output (GPIO) interface, a serial peripheral interface (SPI) interface, a UART interface, I2C interface and a I2S interface. The disclosure does not limit the specific types of the peripheral interface 80, and can be set according to the actual situation.

As illustrated in FIGS. 3 and 4, in an illustrated embodiment, the electronic tag device 1000 may further include: a LED indicator 90 connected to the processor 10, and the LED indicator 90 can emit light of different colors for indicating different working states of the electronic tag device 1000. For example, when the electronic tag device 1000 is in a standby mode, the LED indicator 90 may emit yellow light, and when the electronic tag device 1000 is in a working mode, the LED indicator 90 may emit green light.

Figure 7:
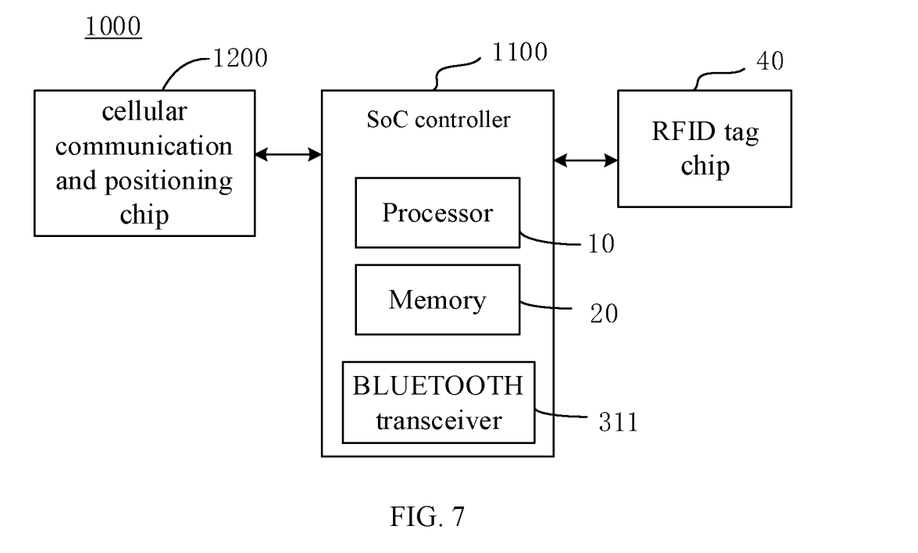
FIG. 7 is a schematic structural diagram of an electronic tag device according to an embodiment of the disclosure.

Another embodiment of the disclosure provides an electronic tag device 1000, as illustrated in FIG. 7, the electronic tag device 1000 may include a SoC controller 1100, a RFID tag chip 40 connected to the SoC controller 1100, and a cellular communication and positional chip 1200 connected to the SoC controller 1100.

Specifically, the SoC controller 1100 is provided with the processor 10 and the memory 20. The memory 20 is configured to store multiple sets of tag data corresponding to different geographic regions.

The cellular communication and positioning chip 1200 is configured to obtain current positional data of the electronic tag device 1000, wirelessly transmit the current positional data to a server to thereby enable the server to output a tag data updating instruction in response to a current geographical region where the electronic tag device 1000 is located determined by the current positional data is different from a previously determined geographical region, wirelessly receive the tag data updating instruction from the server, and transmit the tag data updating instruction to the SoC controller 1100.

The SoC controller 1100 is configured to obtain a target set of tag data corresponding to the tag data updating instruction from the multiple sets of tag data stored in the memory and transmit the target set of tag data to the RFID tag chip 40 for tag data updating In an illustrated embodiment, as shown in FIG. 7, the SoC controller 1100 is further provided with a BLUETOOTH transceiver 311.

Figure 8:
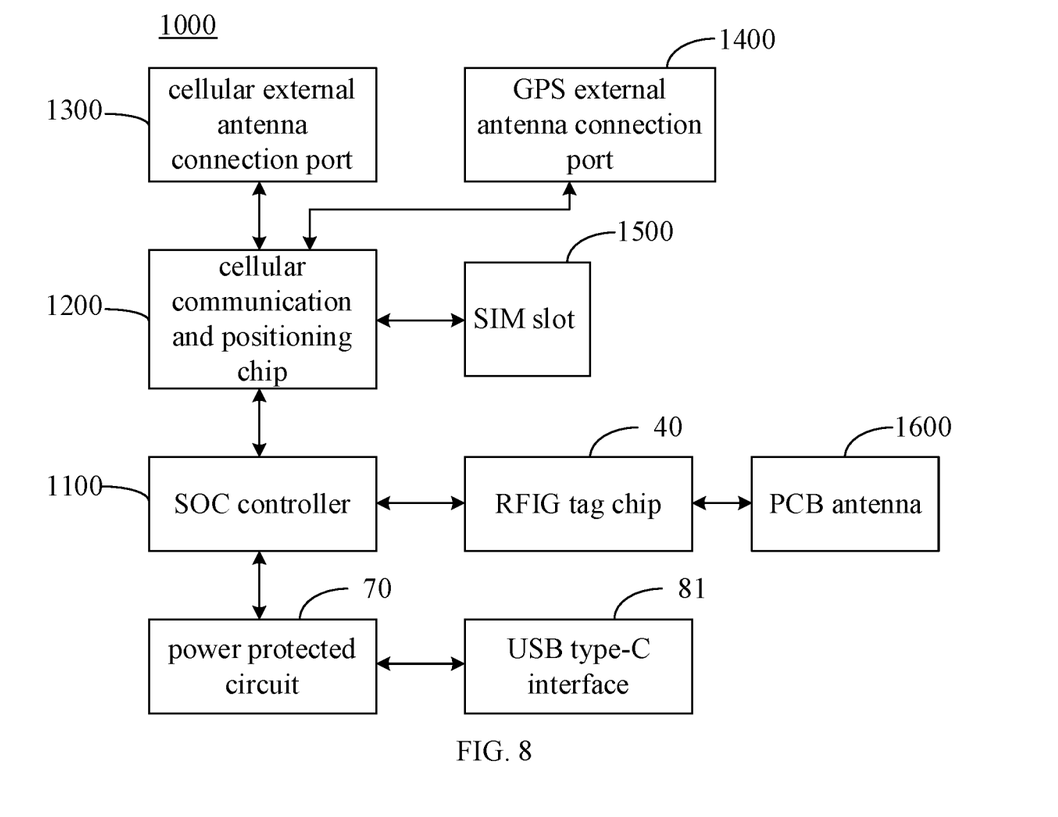
FIG. 8 is a schematic structural diagram of an electronic tag device according to an embodiment of the disclosure.

In an illustrated embodiment, as shown in FIG. 8, the electronic tag device 1000 further includes: a cellular external antenna connection port 1300, a GPS external antenna connection port 1400, a SIM slot 1500, a PCB antenna 1600, a power protected circuit 70 and a USB type-C interface 81.

The cellular external antenna connection port 1300 and the GPS external antenna connection port 1400 are individually connected to the cellular communication and positioning chip 1200. The SIM slot 1500 is connected to the cellular communication and positioning chip 1200 and configured to receive a SIM card. The PCB antenna 1600 is connected to the RFID tag chip 40. The power protected circuit 70 is connected to the SoC controller 1100. The USB type-C interface 81 is connected to the power protected circuit 70 and configured to connect an in-vehicle power supply.

In an illustrated embodiment, the SoC controller 1100 is connected to the cellular communication and positioning chip 1200 via a universal asynchronous receiver/transmitter (UART) bus, and the SoC controller 1100 is connected to the RFID tag chip 40 via an inter-integrated circuit (I2C) bus.

It is worth mentioning that, the SoC controller 1100 may be provided with the processor 10, the memory 20 and the wireless data transmission circuit 30. The cellular communication and positioning chip 1200 may be provided with the positioning circuit 60 and the cellular communication circuit 50.

In an illustrated embodiment, the SoC controller 1100 may be a chip with a model of ESP32-C3, the RFID tag chip 40 may be a Monza© X-8K tag chip, and the cellular communication and positioning chip 1200 may be a chip with a model of SARA-R510M8S.

Figure 10:
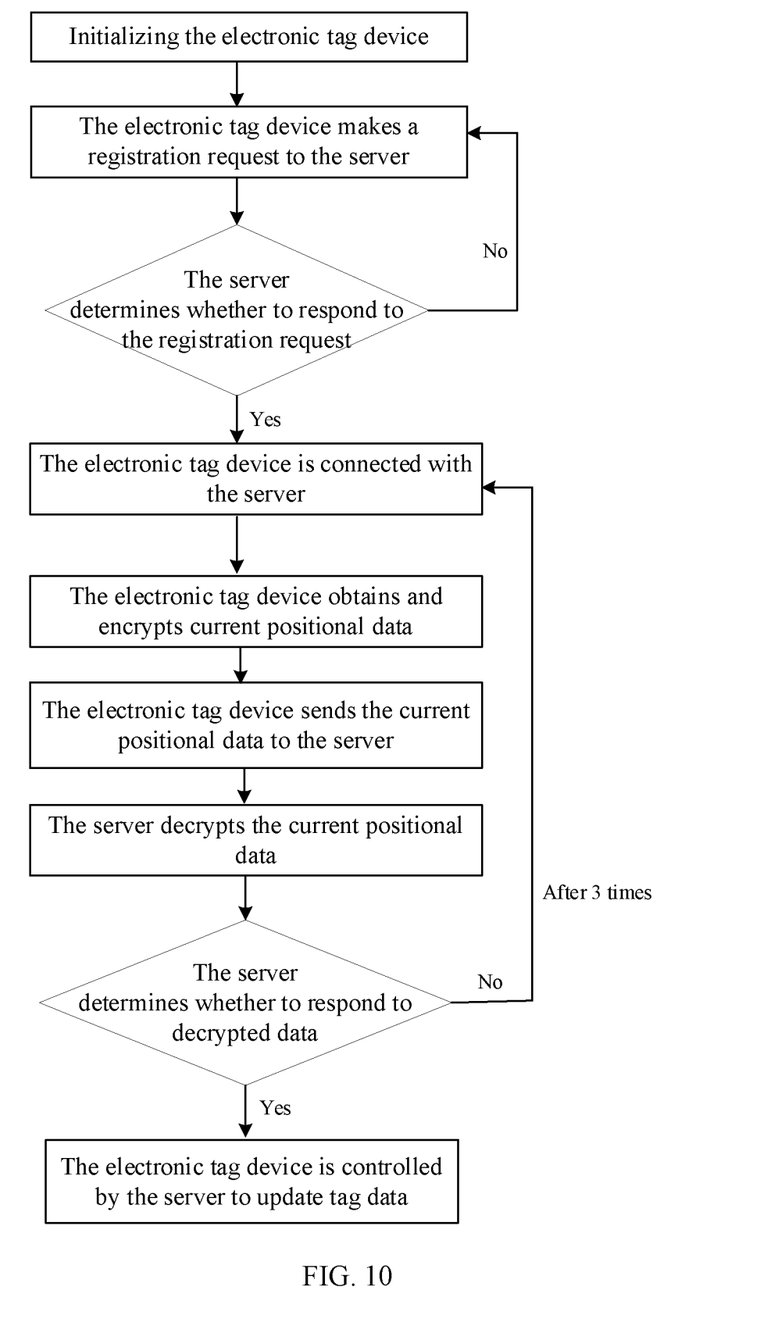
FIG. 10 is a flowchart of a communication progress between an electronic tag device and a server according to an embodiment of the disclosure.
Figure 11:
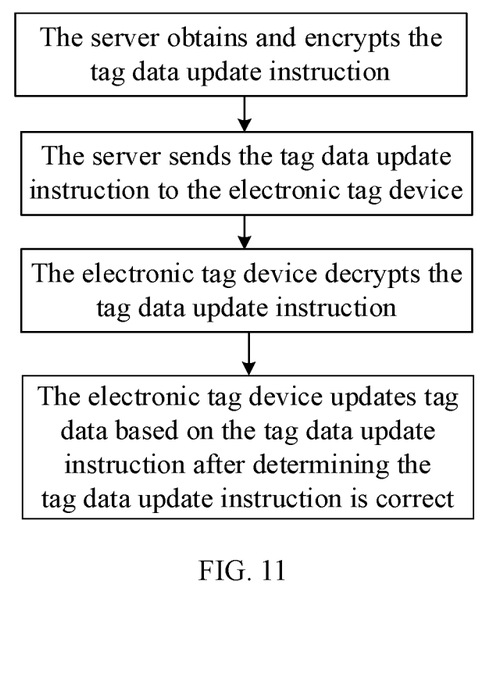
FIG. 11 is a flowchart of another communication progress between the electronic tag device and the server according to an embodiment of the disclosure.

In order to facilitate the understanding of the disclosure, the communication process between the electronic tag device 1000 disclosed by the disclosure and the server 2000 is explained below in combination with FIGS. 9-11.

The electronic tag device 1000 can communicate with the server 2000 through the cellular communication circuit 50, and communicate with the electronic device 3000 through wireless data transmission circuit 30. When the electronic tag device 1000 communicates with the server 2000 for the first time, the electronic tag device 1000 may be initialized, and then the electronic tag device 1000 make a registration request to the server 2000, the server 2000 receives the registration request, and determines whether to respond to the registration request, when the server 2000 responses to the registration request, the electronic tag device 1000 communicates with the server 2000 successfully; when the server 2000 dose not response to the registration request, the electronic tag device 1000 can make the registration request again. After the electronic tag device 1000 communicates with the server 2000 successfully, the cellular communication circuit 50 of the electronic tag device 1000 can encrypt the current positional data obtained from the positioning circuit 60 and then send it to the server 2000, the server 2000 decrypts the current positional data, and determines whether the current positional data is within a data range of the immediately previous geographical region, when the server 2000 determines that the current positional data is not within the data range of the immediately previous geographical region, it can generate a tag data updating instruction corresponding to the current positional data, i.e., when the current positional data indicates that the current geographical region where the electronic tag device is located is different from the immediately previous geographical region, the server 2000 can generate and encrypt the tag data updating instruction, and output the encrypted tag data updating instruction, which can be taken as responding to the current positional data.

The cellular communication circuit 50 of the electronic tag device 1000 receives the encrypted tag data updating instruction from the server 2000, decrypts the encrypted tag data updating instruction and then transmits the tag data updating instruction to the processor 10 of the electronic tag device 1000, the processor 10 of the electronic tag device 1000 obtains the target set of tag data corresponding to the tag data updating instruction from the multiple sets of tag data stored in the memory 20 and transmits the target set of tag data to the RFID tag chip 40. The RFID tag chip 40 updates a previous set of tag data to the target set of tag data.

The electronic tag device can store the multiple sets of tag data, which can meet the actual need of users. Specifically, the memory of the electronic tag device is stored with the multiple sets of tag data corresponding to different geographic regions respectively, the electronic tag device can acquire the positional data in real time or periodically and transmit the positional data to the server, the server output the tag data updating instruction when it determines that the current geographical region where the electronic tag device is located determined by the positional data is different from a previously determined geographical region, i.e., the geographical region of the electronic tag device has changed, the electronic tag device obtain the target set of tag data corresponding to the tag data updating instruction from the multiple sets of tag data to complete tag data updating. Therefore, when the electronic tag device disclosed by the disclosure is disposed on an object such as a vehicle, which can save an additional expense for toll settlement caused by an existing electronic tag device of the vehicle being bounded with only one account information. It is conducive to the development of the car leasing industry.

The above are only some of the embodiments of the disclosure, which does not limit a scope of the patent of the disclosure. Without departing from the spirit and scope of the disclosure, the disclosure will also have various changes and improvements. Under the disclosure concept of the disclosure, the equivalent structural transformation made by using the description and attached drawings of the disclosure, directly or indirectly applied in other relevant technical fields, are included in the scope of patent protection of the disclosure.

What is claimed is:

1. An electronic tag device, comprising:
a processor;
a memory, connected to the processor and configured to store multiple sets of tag data;
a wireless data transmission circuit, connected to the processor and configured to wirelessly connect an electronic device;
a radio frequency identification (RFID) tag chip, connected to the processor;
a cellular communication circuit, connected to the processor; wherein the cellular communication circuit is provided with a subscriber identity module (SIM) interface configured to connect a SIM card; and
a positioning circuit, connected to the cellular communication circuit;
wherein the positioning circuit is configured to obtain current positional data of the electronic tag device and transmit the current positional data to the cellular communication circuit;
wherein the cellular communication circuit is configured to receive the current positional data, wirelessly transmit the current positional data to a server to thereby enable the server to output a tag data updating instruction in response to a current geographical region where the electronic tag device is located determined by the current positional data is different from a previously determined geographical region, wirelessly receive the tag data updating instruction from the server, and transmit the tag data updating instruction to the processor; and
wherein the processor is configured to obtain a target set of tag data corresponding to the tag data updating instruction from the multiple sets of tag data stored in the memory and transmit the target set of tag data to the RFID tag chip for tag data updating.

2. The electronic tag device according to claim 1, wherein the cellular communication circuit is specifically configured to:
receive the current positional data, encrypt the current positional data, and wirelessly transmit the encrypted current positional data to the server.

3. The electronic tag device according to claim 1, wherein the cellular communication circuit is specifically configured to:
wirelessly receive the tag data updating instruction after being encrypted by the server, decrypt the received tag data updating instruction, and transmit the decrypted tag data updating instruction to the processor.

4. The electronic tag device according to claim 1, wherein each set of the multiple sets of tag data comprises: an electronic product code (EPC) and a tag identifier (TID).

5. The electronic tag device according to claim 4, wherein the TIDs of the multiple sets of tag data comprise multiple account information corresponding to different geographical regions respectively, and the TID of the target set of tag data comprises one of the multiple account information corresponding to the current geographical region being one of the different geographical regions.

6. The electronic tag device according to claim 1, wherein the positioning circuit supports at least one selected from the group consisting of a global positioning system (GPS), a BeiDou navigation satellite system (BDS), a Galileo satellite navigation system (GALILEO) and a global navigation satellite system (GLONASS).

7. The electronic tag device according to claim 6, wherein the positioning circuit comprises: a global navigation satellite system (GNSS) integrated circuit (IC) connected to the cellular communication circuit, and a GNSS antenna connected to the GNSS IC.

8. The electronic tag device according to claim 1, wherein the cellular communication circuit comprises:
a baseband processor, provided with the SIM interface; and
a radio frequency (RF) transceiver, connected to the baseband processor;
wherein the electronic tag device further comprises a cellular communication antenna connected to the RF transceiver, and the positioning circuit is connected to the baseband processor.

9. The electronic tag device according to claim 8, wherein the electronic tag device further comprises:
a printed circuit board (PCB), provided with a SIM slot; and
the SIM card, disposed in the SIM slot and connected to the SIM interface;
wherein the cellular communication circuit and the positioning circuit are both disposed on the PCB.

10. The electronic tag device according to claim 1, wherein the wireless data transmission circuit comprises: a BLUETOOTH communication circuit connected to the processor and configured to wirelessly connect the electronic device.

11. The electronic tag device according to claim 10, wherein the BLUETOOTH communication circuit is configured to receive BLUETOOTH communication data from the electronic device, convert the BLUETOOTH communication data to obtain converted BLUETOOTH communication data, and transmit the converted BLUETOOTH communication data to the processor; and the processor is configured to store the converted BLUETOOTH communication data into the memory.

12. The electronic tag device according to claim 10, wherein the processor is configured to obtain data to be displayed from the memory, and transmit the data to be displayed to the BLUETOOTH communication circuit; the BLUETOOTH communication circuit is configured to receive the data to be displayed, convert the data to be displayed and then output the converted data to be displayed to the electronic device for user viewing.

13. The electronic tag device according to claim 1, further comprising:
a power protected circuit, connected to the processor; and
a peripheral interface, connected to the power protected circuit and configured to connect an in-vehicle power supply.

14. The electronic tag device according to claim 13, wherein the peripheral interface comprises a universal serial bus (USB) type-C interface; the SIM card is a 4th generation communication system (4G) long term evolution (LTE) nano SIM card; and the processor, the memory and the wireless data transmission circuit all are integrated in a single chip.

15. The electronic tag device according to claim 1, further comprising:
a light emitting diode (LED) indicator, connected to the processor, and wherein the LED indicator is configured to emit light of different colors for indicating different working states of the electronic tag device.

16. An electronic tag device, comprising:
a system-on-chip (SoC) controller with a processor and a memory, wherein the memory is configured to store multiple sets of tag data corresponding to different geographic regions;

a cellular communication and positioning chip, connected to the SoC controller; and a RFID tag chip, connected to the SoC controller;

wherein the cellular communication and positioning chip is configured to obtain current positional data of the electronic tag device, wirelessly transmit the current positional data to a server to thereby enable the server to output a tag data updating instruction in response to a current geographical region where the electronic tag device is located determined by the current positional data is different from a previously determined geographical region, wirelessly receive the tag data updating instruction from the server, and transmit the tag data updating instruction to the SoC controller; and wherein the SoC controller is configured to obtain a target set of tag data corresponding to the tag data updating instruction from the multiple sets of tag data stored in the memory and transmit the target set of tag data to the RFID tag chip for tag data updating.

17. The electronic tag device according to claim 16, wherein the SoC controller is further provided with a BLUETOOTH transceiver.

18. The electronic tag device according to claim 16, wherein each set of the multiple sets of tag data comprises an EPC and a TID, the TIDs of the multiple sets of tag data comprise multiple account information corresponding to the different geographic regions respectively, and the TID of the target set of tag data comprises one of the multiple account information corresponding to the current geographical region being one of the different geographical regions.

19. The electronic tag device according to claim 18, further comprising:

a cellular external antenna connection port and a GPS external antenna connection port, individually connected to the cellular communication and positioning chip;

a SIM slot, connected to the cellular communication and positioning chip and configured to receive a SIM card;

a PCB antenna, connected to the RFID tag chip;

a power protected circuit, connected to the SoC controller; and a USB type-C interface, connected to the power protected circuit and configured to connect an in-vehicle power supply.

20. The electronic tag device according to claim 16, wherein the SoC controller is connected to the cellular communication and positioning chip via a universal asynchronous receiver/transmitter (UART) bus, and the SoC controller is connected to the RFID tag chip via an inter-integrated circuit (I2C) bus.

* * * * *